(12) United States Patent
Saje

(10) Patent No.: US 7,393,242 B1
(45) Date of Patent: Jul. 1, 2008

(54) COMPUTER EQUIPMENT STORING AND TRANSPORTING ORGANIZER SYSTEM

(76) Inventor: Robert N. Saje, 46266 Hampton Dr., Shelby Township, MI (US) 48315

(*) Notice: Subject to any disclaimer, the term of this patent is extended or adjusted under 35 U.S.C. 154(b) by 0 days.

(21) Appl. No.: 11/715,015

(22) Filed: Mar. 5, 2007

(51) Int. Cl.
 *H01R 13/72* (2006.01)
(52) U.S. Cl. ..................................................... 439/501
(58) Field of Classification Search ................ 439/501, 439/367; 206/320, 324, 307.1; 224/576, 224/581; 361/383, 683; 242/378; 220/4.03; 174/84 R
See application file for complete search history.

(56) References Cited

U.S. PATENT DOCUMENTS

| | | | | |
|---|---|---|---|---|
| 1,020,050 A | * | 3/1912 | Padrick | 206/349 |
| 2,744,621 A | * | 5/1956 | Kegevic | 312/293.2 |
| D316,649 S | * | 5/1991 | Swanner | D3/270 |
| 5,024,361 A | * | 6/1991 | Flowers | 224/223 |
| 5,598,921 A | | 2/1997 | Hunt | |
| 5,669,571 A | | 9/1997 | Graybill | |
| 5,808,865 A | | 9/1998 | Alves | |
| 6,026,961 A | * | 2/2000 | McCarthy et al. | 206/576 |
| 6,149,001 A | | 11/2000 | Akins | |
| 6,209,734 B1 | * | 4/2001 | Wang | 211/87.01 |

\* cited by examiner

*Primary Examiner*—Alexander Gilman

(57) ABSTRACT

A computer cord storing and transporting organizer pouch and system for securing and organizing computer associated equipment such as cords, connectors, lines, power cord and transformer, internet cable, computer mouse and security cable, the pouch being of adequate size to be easily carried while affixed to any laptop or notebook computer, the pouch having pockets of similar size so that any piece of associated equipment can be stored within any pocket, the pouch being of adequate size to be inserted into a computer carrying case while affixed to the computer, the pockets of the pouch having access holes for cords, lines and cables to extend, the pockets and access holes sized and located to create an efficient interface between pouch and computer which allows permanent connection and convenient transportation in addition to reducing set-up and tear down time, tangle, loss of components and damage to accessories.

4 Claims, 7 Drawing Sheets

COMPUTER EQUIPMENT STORING AND TRANSPORTING ORGANIZER SYSTEM

CROSS-REFERENCE TO RELATED APPLICATIONS

Not applicable

BACKGROUND

1. Field of the Invention

The present invention relates to a new cord storage, organizing and transporting pouch and system for use in conjunction with a laptop or notebook computer and standard computer carrying cases and bags.

2. Background of the Invention

In recent years, "laptop," "notebook," and similar compact computers have become extremely popular. Computer users have found that they may transport such computers, along with vital operating peripherals, connectors, converters, and similar equipment (such cords, lines, power supply, mouse, security cable, and other equipment may be referred to herein collectively as the computer "associated equipment"), to establish a temporary, but functional, office virtually anywhere. Laptops and notebooks are also used effectively in more usual office environments as a computer user's only computer.

One problem with traveling with a laptop computer, however, is the transportation of associated equipment. Some computer users may decide to carry the laptop in a large, cumbersome and heavy computer carrying case that often includes pockets for carrying associated equipment. The pockets are simply places to store, and provide no assurance that associated equipment will not be left behind after use, or lost during travel.

Another problem with traveling with a laptop computer, however, is some computer users decide not to use carrying cases because it may be heavy due to other items also being stored within it. Therefore, the computer user often elects to not use the carrying case but transport associated equipment on top of the laptop computer. The associated equipment must be arranged on the top, protective surface of the openable monitor portion of the computer, and be transported in a very stable horizontal orientation in order for associated equipment not to fall off the computer surface onto the ground and become tangled or lost. Some computer users even coil the associated equipment and temporarily place them into their pant pockets or purse.

Another problem with traveling with a laptop computer that is accompanied by a computer connector organizing pack is that the pack which contains associated equipment is separate from the laptop requiring that the computer user carry two separate entities, the laptop and the cord pack. The computer user either packs both of them into a large, cumbersome and heavy carrying case which becomes even heavier, or attempts to carry each entity in separate hands or attempts to carry both entities with one hand. For the later scenario, it is difficult for one hand to accommodate the combined thickness of the laptop computer and cord pack especially for people with small hands.

Another problem associated with laptop carrying cases or packs is that the entities are specifically designed with designated compartments thereby limiting cord length and compromising the universal application of the device. The size and shape of pockets and routing channels require that the computer user install specific associated equipment into pre-determined compartments with specific volumes thereby preventing the user from deciding which compartment will store associated equipment in addition to the limiting the amount of associated equipment that can be stored within it.

Another problem with traveling with a laptop computer is the bulk of associated equipment. Since a user does not know the location of a power source or telephone jack prior to setup, or where a power source and telephone jack will lie in relation to the jacks in the laptop, long cords are often supplied to fit all possible configurations, and additional space is required to store and manage the longer cords.

3. Description of the Prior Art

The use of cord storage and dispensing organizers for cords and computer equipment of various designs and configurations is known in the prior art. Such designs include:

Akins et al U.S. Pat. No. 6,149,001 discloses a cover for a laptop or notebook computer. As evident by the claims disclosure the device is intended to protect the computer. The claims do not include storage pockets. This device acts as a protective glove to minimize scratches and damage to a laptop or notebook computer and is designed to specific manufacturer model dimensions. The glove encompasses the top openable portion of the computer and also the base. The openable and base gloves are pivotally attached as an assembly. Since the glove encompasses the entire computer it must be designed specific to each and every manufacturer model for length, width, height of both base and monitor portions in addition to requiring precise cut-outs to provide access to associated equipment connections at the base, around the monitor, keys, fan, power button and other significant features. As evident within table 1, the glove must be tailored to fit many different models and does not provide flexibility for future variants nor a universal design or construction strategy. This device provides storage pockets for pencils, floppy and CD ROM disks and provides a pocket to store the power supply cord but none of the pockets are included within the claims. It does not include pockets of adequate volume to store other vital associated equipment required to set-up the computer as an operating workstation at different locations. It does not provide storage pockets for internet cable, mouse assembly and security cable. Although it specifies that the glove includes a pocket for storing the power supply cord, it does not state nor pictorially indicate that sufficient volume is provided to also store the transformer portion of the power supply cord which typically measures at least 1 inch wide by 2 inches tall by 6 inches in length. This device does not provide a means of maintaining associated connections to the base connectors. Even though the device provides a power supply cord pocket, it does not provide a design feature such as an access hole within the pocket which allows the power supply cord to be routed through and stay connected to the power supply connection to the computer.

Alves U.S. Pat. No. 5,808,865 discloses a flexible protective case for disk or tape drive units. It is not a protective case for laptop or notebook computers. It is not affixed to a laptop or notebook computer and does not provide a means for maintaining associated equipment connections to the laptop or notebook computer while it is being carried. It does not provide the means to store vital associated equipment required to set-up the laptop or notebook computer as an operating workstation at different locations.

McCarthy et al U.S. Pat. No. 6,026,961 is a computer cord storage and dispensing organizer and system. It is a book-like carrying case that is transported as a separate entity from the laptop or notebook computer.

While the devices disclosed in the aforementioned patents satisfy their objectives, only U.S. Pat. No. 6,026,961 describes a device for carrying, storing and organizing vital associated equipment including power cord transformer assembly, internet cable and mouse assembly but no security cable. It is a system for reducing setup and packing time, reducing space and bulk during travel and use, organizing computer cords and eliminating tangle and mess and facilitating cord and connector management, and ensures that all associated equipment is included in packing and moving a computer while no associated equipment is misplaced or damaged.

However, the present invention significantly departs from pre-existing designs of the prior art, and in so doing provides the user with a means for accomplishing all of the above tasks in a single unit which is designed to be affixed to the laptop or notebook computer. By using the invention disclosed herein, the user thereby gains the highly desirable abilities to move a computer quickly and efficiently, to set up and maintain a computer with minimum disarray and confusion, and to reduce the risk of damage or loss of components which might make the computer inoperable.

SUMMARY OF THE INVENTION

This invention relates to a device to contain and transport associated equipment for a laptop or notebook computer. More particularly, it relates to a device that is affixed to a laptop or notebook computer which provides storage pockets which significantly improves the ability to contain and transport associated equipment such as internet cable, security cable, power cord and converter and mouse assembly. The device allows permanent attachment of associated equipment to the laptop or notebook and optimizes transportation by providing affixed compartmentalized storage thereby reducing tangle, dropping and loss of components, reduced set-up and tear down time and damage to equipment. The device is universal since it can be used on any sized laptop or notebook computer and also works with laptop or notebook computer carrying cases. The device is easily manufacturable and customizable.

The present invention overcomes the problems and disadvantages of the prior art by allowing users to carry computer associated equipment in a multi-pocket device that is affixed to the laptop or notebook computer via Velcro fasteners. It allows users to carry all computer associated equipment in a single container, or encapsulated unit, and deploy the associated equipment quickly and efficiently, in an orderly and organized configuration, and maintain order among such associated equipment, with minimum risk of loss or damage. These benefits are afforded the user of the present invention throughout all phases of use, i.e. while traveling with a computer, while packing of the computer and associated equipment for travel and unpacking at a new location, and while working on the computer.

Specifically, the new universal organizing device and system of the present invention which is affixed to the protective surface of the openable monitor portion of a laptop or notebook computer comprises, in one preferred embodiment, a strong, resilient fabric pouch with common sized pockets with bottom surface access holes and one common closure. The storage pockets in such preferred embodiment are designed to hold each component necessary to computer operation, each storage pocket being similar in size to allow the computer user to place any associated equipment into any storage pocket.

The pouch of the present invention, in one preferred embodiment, is affixed to the protective surface of the top, openable monitor portion of a laptop or notebook computer via Velcro-type fabric fasteners. The pouch includes approximately 6 Velcro-type fabric fasteners to provide sufficient retention of the pouch to the laptop or notebook when it contains associated equipment of significant length. Velcro-type fabric fasteners are adhesively affixed to the top, protective surface of the openable monitor portion of the computer at locations corresponding to the Velcro-type fabric fasteners attached to the pouch. Proper spacing between the computer and the pouch is achieved since all Velcro-type fabric fasteners are pre-assembled to the pouch by the manufacturer where the user removes the plastic covering from the laptop side Velcro-type fabric fasteners to reveal the adhesive portion of the fastener and places and presses the pouch assembly on the top, protective surface of the openable monitor portion of the laptop to achieve connection.

The pouch of the present invention, in one preferred embodiment, is very convenient to transport even while affixed to the computer when loaded with associated equipment of significant length. The computer user transports the computer and pouch assembly just as transporting only the computer itself. The user's arm touches the pouch and compresses the flexible material. The four pocket configuration provides a natural center seam location that works in conjunction with the arm positioned with the user's hand holding the computer near centerline. The arm minimally displaces the associated equipment within the pockets to provide a comfortable arrangement during transportation. A pouch composed of a more rigid material, such as plastic, would not provide as much compressibility thereby making the pouch, while affixed to the computer, less comfortable to transport.

The pouch of the new organizing device and system of the present invention, is universal because it can be placed within a computer carrying case or bag of standard size, even while affixed to a laptop or notebook computer. The user either loads the associated equipment into the carrying case and compresses the flexible material pouch which is affixed to the computer or the user retains the associated equipment within the pouch and compresses the flexible material carrying case compartments. By the user retaining the associated equipment within the pouch they take advantage of its benefits by maintaining all connections to the computer and conveniently slip the pouch and computer assembly into the carrying case. A pouch composed of a more rigid material, such as plastic, would not provide as much compressibility thereby degrading its compatibility with computer carrying cases or bags.

The pouch of the present invention, in one preferred embodiment, is universal because it includes Velcro-type fabric fasteners which are dimensioned to fit the smallest laptop family size (approximately 8 inches by 11.75 inches) in order to provide universal application. The small laptop family dimensioned Velcro-type fabric fastener pattern also works with medium and large laptop family sizes (10 inches by 14 inches and 11.5 inches by 16 inches, respectively).

The pouch of the present invention, in one preferred embodiment, is universal since the similarly sized pockets allow the computer user to store any associated equipment within any pocket based on proximity to computer connection locations per any manufacturer model in order to minimize the amount of associated equipment extending from the pocket, through the bottom access hole, over to the laptop connection. The similarly sized pockets are large enough to store mouse assembly with approximately 6 feet of cord or more, approximately 13 feet of internet cable or more, approximately 9.5 feet of power converter and cord or more and approximately 10 feet of security cable or more. The flexible material is forgiving so the pockets deform to accept different lengths of associated equipment and also deform when the user places their hand within the pocket to remove associated equipment. A pouch composed of a more rigid material, such as plastic, would not provide as much forgiveness and would minimize the accommodation of different lengths of associated equipment and make it more difficult for the computer user to insert their hand into the pocket in order to easily remove associated equipment.

The pouch of the present invention, in one preferred embodiment, has pockets which include access holes in the bottom surface to allow the associated equipment to exit the pocket, minimize the length of associated equipment extending from the pocket and maintain connections to the laptop side connectors. In order to simplify the fabrication process, the left and right compartment access holes can be cut along the bottom folded edge and are located on the outboard corners of the blank while the center compartment access holes are located along the centerline of the blank and share a common cut-out.

The pouch of the present invention, in one preferred embodiment, has a cover flap to retain associated equipment within all pockets. The cover flap is connected to the back side of the pouch via Velcro-type fabric fasteners with locations coordinated near the upper outboard Velcro-type fabric fasteners used to affix the pouch to the computer. The locations are coordinated in order to minimize the number of Velcro-type fabric fasteners and minimize the number of operations of assembly. The cover flap extends to the front side of the pouch and has at least two Velcro-type fabric fasteners near the upper outboard corners to make it easy for the computer user to attach and detach the fasteners. The cover flap can be customized by choosing fabric colors similar to or different than the pouch. A logo can be attached to the cover flap to customize the pouch assembly.

The pouch of the present invention, in one preferred embodiment, is easy to manufacture by using a fold and connect manufacturing process. The pouch flexible material blank is connected and folded in specific areas and along process fold lines to create pockets with depth. The pockets are created by using three segmenting connections and three pocket forming processes utilizing four forming lines on the back side and two forming lines on the front side. Therefore, the pouch has only one visible pocket forming connection on the front side since the two pocket forming connections on the back side are hidden after affixing the pouch to the computer.

The pouch of the present invention, in one preferred embodiment, is easily customized since it can be made with similar or different colored flexible material. The center portion of the front face of the pouch can be cut out and replaced with a different colored flexible material and still be manufactured just as easily with the fold and connect manufacturing process described above. The color of the cover flap can also be tailored to match or not match the pouch color.

The pouch of the present invention, in one preferred embodiment, has no effect on the computer monitor hinge and hold open hardware since the pouch is composed of such lightweight, flexible material. The preferred mode of operation requires that the computer user removes associated equipment from the pouch, while it is affixed to the computer, and makes supply side connections prior to opening the monitor. Therefore, the mass of the associated equipment within the pockets will not affect how well the monitor stays in its open position since the pockets are empty.

In accordance with the purpose of the present invention, as embodied and broadly described herein, the invention relates to a method, system, or process for enabling a user to maintain organization and control of the associated equipment of a laptop or other computer, comprised of:

(i) packing associated equipment for a single computer within similarly sized pockets situated on a single organizing unit as described herein, (ii) transporting associated equipment within the organizing unit while it is affixed to the computer, (iii) maintaining components and excess length of associated equipment within the organizing unit while traveling with the computer, (iv) gathering associated equipment into a manageable group, by wrapping the cords and connectors around the users hands and placing them into pockets of the organizing unit, (v) extending associated equipment from the pockets of the organizing unit, through the appropriate access hole, to the computer a minimum distance from each pocket of the pouch, (vi) extending associated equipment from the pockets of the organizing unit, through access holes, an indeterminate distance to receptacles for power, internet service and security, (vii) working with the organizing unit while it is affixed to the computer, the associated equipment extending from the computer, from various pockets through access holes, and to such receptacles, (viii) re-wrapping the associated equipment and placing them back into the organizing unit after work is complete, to the same pockets from which it was taken prior to use, (ix) closing the organizing unit and, (x) in some cases, inserting the organizing unit while affixed to the computer, into an appropriate compartment of a computer traveling case for transport to another location.

The more important features of the invention have thus been outlined, rather broadly, so that the detailed description thereof that follows may be better understood, and in order that the present contribution to the art may be better appreciated. Additional features of the specific embodiments of the invention will be described below.

However, before explaining preferred embodiments of the invention in detail, it may be noted briefly that the pouch of the present invention provides the opportunity to maintain computer associated equipment in an orderly and organized configuration throughout all phases of transporting, packing, using, and unpacking for use of a computer, and all its associated equipment. This is accomplished through the expedient securing of all associated equipment within pockets of the pouch to keep all equipment in one place and organized, the pockets sized similarly to allow the user to decide which pocket contains associated equipment based on location of connectors specific to computer manufacturer model, and providing access holes of appropriate size for quick and easy access to associated equipment to reduce the distance between the pouch and the computer. The flexible pouch of the present invention allows a user to maintain the organization of all computer associated equipment, and quickly and efficiently set-up and tear down a computer for pleasant, efficient travel from place to place, without fear of loss or damaged associated equipment. Such advantages have not been hitherto available to users with the organizing unit affixed to the computer.

OBJECTS OF THE INVENTION

The principal object of the present invention is to provide a new device for storing, organizing, transporting, and maintaining the organization of cords, connectors, and other equipment associated with a "laptop" or "notebook" computer.

A further principal object of the present invention is to provide a new system for organizing and maintaining the organization of cords, connectors, and other equipment associated with a computer.

A further object of the present invention is to provide a new device and system for organizing computer associated equipment in a flexible pouch of proper size which is easy to carry because it is affixed to any size "laptop" or "notebook" computer.

A further principal object of the present invention is to provide a new device and system with similarly sized pockets so the user can decide which pocket contains associated equipment based on location of connectors specific to their manufacturer model.

A further principal object of the present invention is to provide a new system for organizing and maintaining computer associated equipment which is easy to manufacture with multiple folds and connections of flexible material.

A further principal object of the present invention is to provide a new device and system for managing computer associated equipment by providing many similarly sized pockets for any piece of equipment for easy access to cords and connectors, and for minimizing the length of cords and connectors extending from the pouch to the computer through access holes, to thereby reduce the distance between these components.

A further principal object of the present invention is to provide a new device and system for minimizing the number of items to consider when packing and unpacking a computer upon moving it, by storing the amount and number of cords, connectors and associated equipment within a single unit which may be used to encapsulate all of the associated equipment necessary to utilize the computer.

A further object of the present invention is to provide a new device and system for organizing computer associated equipment in a flexible pouch of proper size which is affixed to the laptop or notebook computer, for easy insertion of the pouch, and all components contained therein, into a standard-size computer case or bag.

A further object of the present invention is to provide a new device and system for eliminating the loss of components.

A further object of the present invention is to provide a new device and system for retaining all components in a flexible pouch.

A further object of the present invention is to provide customization by composing the pouch blank and/or cover flap of one or multiple colored flexible fabrics which enables a fold and connect manufacturing process.

BRIEF DESCRIPTION OF THE DRAWINGS

The accompanying drawings, which are incorporated in and constitute a part of this specification, illustrate one embodiment of the invention and, together with the description, serve to explain the principles of the invention.

DESCRIPTION OF THE PREFERRED EMBODIMENT

Figure 1:
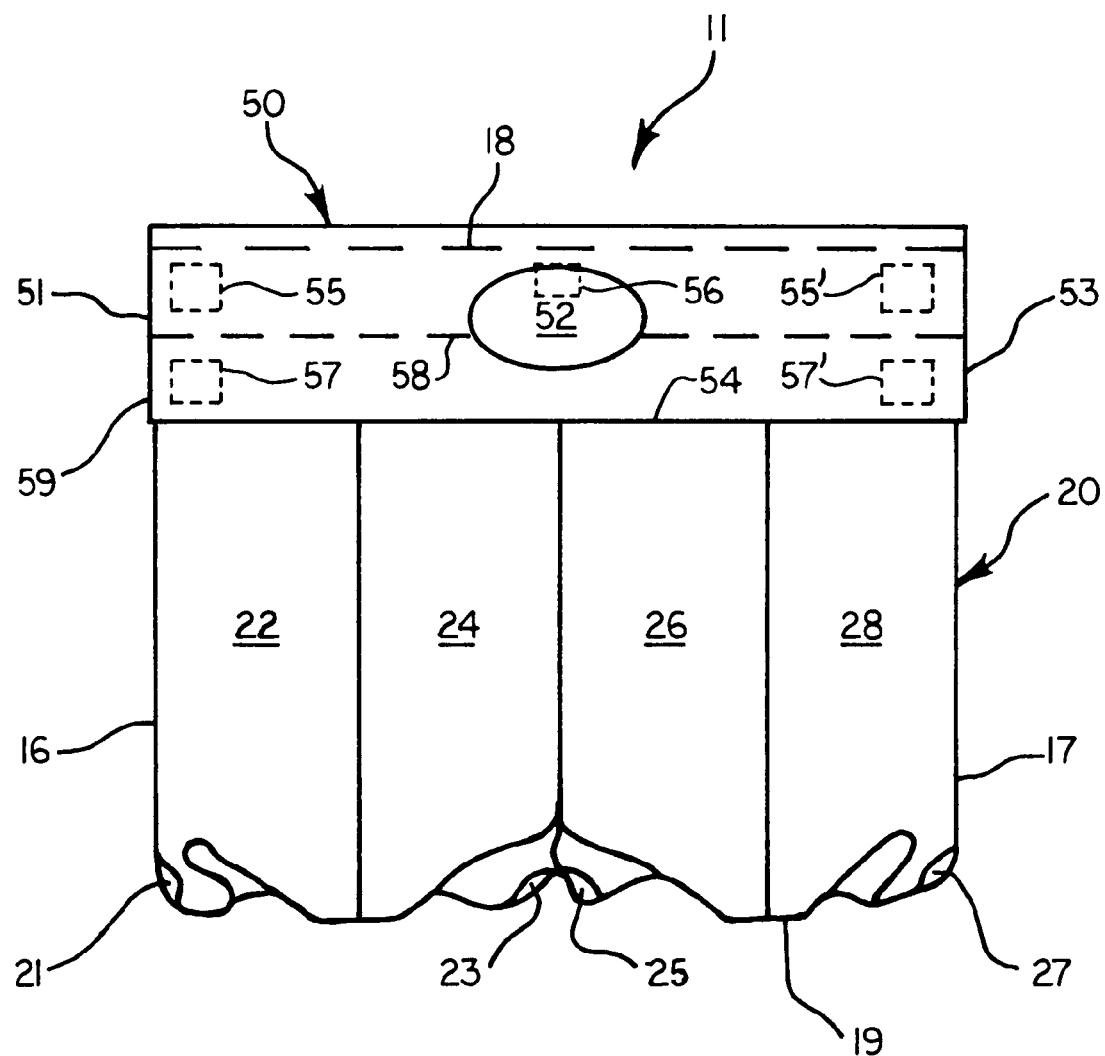
FIG. 1 is a front view of a first preferred embodiment of the present invention in a closed configuration showing the arrangement of pockets and cover flap.

Referring initially to FIG. 1, the new storage and organizing assembly and system pouch 11 constructed in accordance with the principles of the present invention is shown, in one embodiment, from the front view in a closed configuration, as it would be configured when affixed to the top of a computer, while being carried with the computer or as it would be when loaded into a carrying case while affixed to a computer. The overall dimensions of the preferred embodiment of the present invention are approximately 11½ inches wide by approximately 8½ inches high by approximately 3 inches deep. The pouch 11 in FIG. 1 has a left edge 16, a right edge 17, a top edge 18 and a bottom folded edge 19. The individual elements of pockets, fasteners, closure and customizable logo include a main body 20, a left pocket 22 with access hole 21, a left center pocket 24 with access hole 23, a right center pocket 26 with access hole 25, a right pocket 28 with access hole 27, a cover flap 50, a logo 52 and an edge treatment 59. All pockets are similarly sized in order to hold any one of the associated equipment and are approximately 8 inches high by approximately 2⅞ inches wide by approximately 2⅞ inches deep. The individual elements of the cover flap 50, intended to attach to pouch 20 in order to retain associated equipment within pockets include, a left edge 51, a right edge 53, a front edge 54, a left front side corner Velcro-type fabric fastener 57, approximately 1 inch high by approximately 1 inch wide, located approximately ½ inch from left edge 51 and approximately ½ inch from front edge 54, a right front side corner Velcro-type fabric fastener 57', approximately 1 inch high by approximately 1 inch wide, located approximately ½ inch from right edge 53 and approximately ½ inch from front edge 54, a left back side corner Velcro-type fabric fastener 55, approximately 1 inch high by approximately 1 inch wide, located approximately ½ inch from left edge 51 and approximately ½ inch from back edge 58, a right back side corner Velcro-type fabric fastener 55' which is approximately 1 inch high by approximately 1 inch wide, located approximately ½ inch from right edge 53 and approximately ½ inch from back edge 58, a back side center Velcro-type fabric fastener 56, approximately 1 inch high by approximately 1 inch wide, located approximately 5¼ inches from right edge 51 and approximately ½ inch from back edge 58 and a logo 52 centerline located approximately 5¼ inches from left edge 51 and approximately 1½ inches from front edge 54. Cover flap Velcro-type fabric front side fastener 57 locates to pouch 20 Velcro-type fabric fastener 34 shown in FIG. 4, cover flap Velcro-type fabric front side fastener 57' locates to pouch 20 Velcro-type fabric fastener 34' shown in FIG. 4, cover flap Velcro-type fabric back side fastener 55 locates to pouch 20 Velcro-type fabric fastener 30 shown in FIG. 4, cover flap Velcro-type fabric back side fastener 55' locates to pouch 20 Velcro-type fabric fastener 30' shown in FIG. 4 and cover flap Velcro-type fabric back side fastener 56 locates to pouch 20 Velcro-type fabric fastener 31 shown in FIG. 4.

Figure 2:
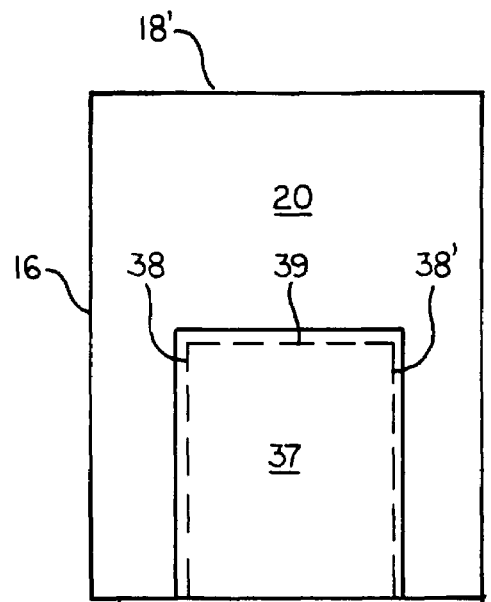
FIG. 2 is a top view of a first preferred embodiment of the present invention in a blank configuration to create a 2 colored pouch when layed on table top during the manufacturing process.

In FIG. 2, the new storage and organizing assembly and system pouch 20 constructed in accordance with the principles of the present invention is shown as configured during fabrication when the blank used to form pouch 20 is layed open and placed on a tabletop in order to attach a patch blank 37 used to create a multi-color pouch. The blank used to form pouch 20 is approximately 24 inches wide by approximately 18 inches high. A section, approximately 12 inches wide by approximately 8 inches high is removed from the blank used to form pouch 20 and is replaced by a second color blank 37, approximately 13 inches wide by approximately 9 inches high along lines 38, 38' and line 39. Attachment line 38 is approximately 6 inches from left edge 16, attachment line 38' is approximately 6 inches from right ledge 17 and attachment line 39 is approximately 9 inches from top edge 18.

Figure 3:
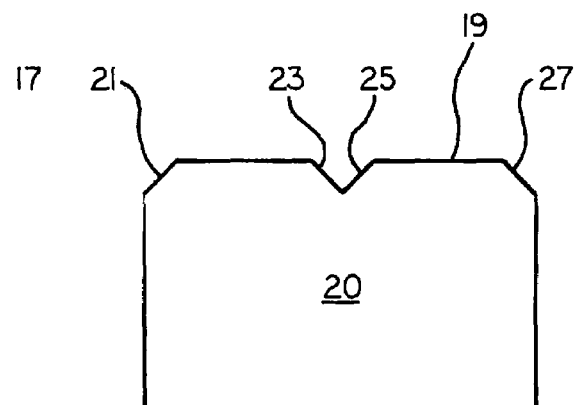
FIG. 3 is a top view of a first preferred embodiment of the present invention in a blank configuration to create access holes along the bottom folded surface.

In FIG. 3, the new storage and organizing assembly and system pouch 20 constructed in accordance with the principles of the present invention is shown as configured during fabrication when the blank is folded in half, approximately 24 inches wide by approximately 9 inches high in order to create access holes while minimizing the number of cutting operations. Access holes 21, 23, 25 and 27 are created by cutting along folded bottom edge line 19. Left access hole 21 and right access hole 27 dimensions are approximately 1½ inches wide by approximately 2 inches high while left center access hole 23 and right center access hole 25 are combined to create an opening approximately 3 inches wide by approximately 2 inches high. The outboard edge of access hole 23 is cut approximately 10½ inches from left edge 16 and approximately 7½ inches from top edge 18 and access hole 25 is cut approximately 10½ inches from right edge 17 and approximately 7½ inches from top edge 18.

Figure 4:
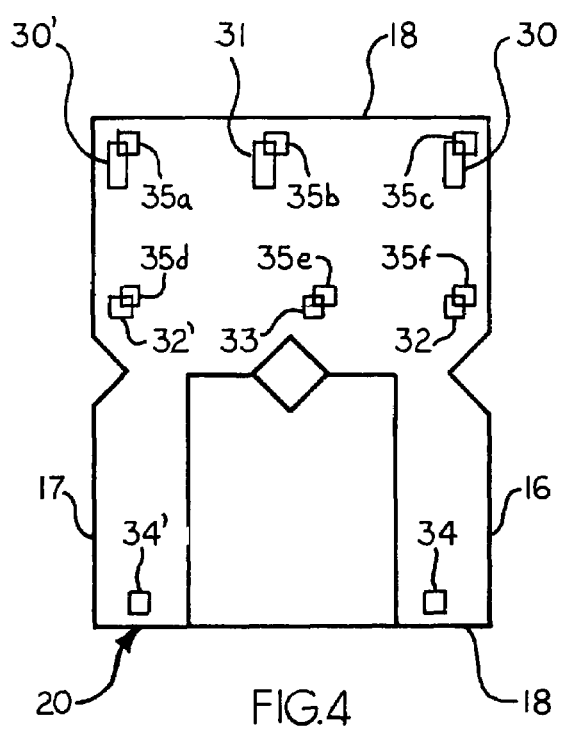
FIG. 4 is a top view of a first preferred embodiment of the present invention in a configuration for adding Velcro-type fabric fasteners and treating edges.

In FIG. 4, the new storage and organizing assembly and system pouch 20 constructed in accordance with the principles of the present invention is shown as configured during fabrication when the blank is layed open and placed on a tabletop on the back surface to attach Velcro-type fabric fasteners used to affix the pouch 20 to the computer and to fasten the cover flap 50. Upper Velcro-type fabric fasteners 30, 30' and 31 are approximately 1 inch wide by approximately 2 inches tall and Velcro-type fasteners 32, 32', 33, 34 and 34' are approximately 1 inch wide by 1 inch high. Velcro-type fastener 30 is attached to the upper corner of the blank used to form pouch 20 approximately ½ inch from left edge 16 and approximately ½ inch from top edge 18', Velcro-type fastener 30' is attached to the upper corner of the blank used to form pouch 20 approximately ½ inch from right edge 17 and approximately ½ inch from top edge 18' and Velcro-type fastener 31 is attached to the blank used to form pouch 20 approximately 11 inches from left edge 16 and approximately ½ inches from top edge 18'. Velcro-type fastener 32 is attached to the blank used to form pouch 20 approximately ½ inch from left edge 16 and approximately 5½ inches from top edge 18', Velcro-type fastener 32' is attached to the blank used to form pouch 20 approximately ½ inch from right edge 17 and approximately 5½ inches from top edge 18' and Velcro-type fastener 33 is attached to the blank used to form pouch 20 approximately 11½ inches from right edge 17 and approximately 5½ inches from top edge 18'. Velcro-type fastener 34 is attached to the blank used to form pouch 20 approximately 3 inches from left edge 16 and approximately ½ inch from edge 18 and Velcro-type fastener 34' is attached to the blank used to form pouch 20 approximately 3 inches from right edge 17 and approximately ½ inch from edge 18. Velcro-type fasteners 35*a*, *b*, *c*, *d*, *e* and *f* are affixed to Velcro-type fabric fasteners 30, 30', 31, 32, 32' and 33. Protective plastic coating on Velcro-type fabric fasteners 35*a*-35*f* is removed by the computer user to expose adhesive which is used to affix the system pouch 11 to the computer. Velcro-type fabric fasteners 34 and 34' are used to close the cover flap by connecting Velcro-type fasteners 57 and 57' shown in FIG. 1.

Figure 5:
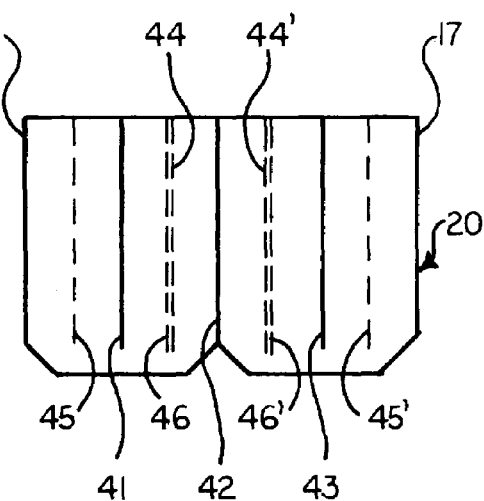
FIG. 5 is a top view of a first preferred embodiment of the present invention in a configuration for connecting the left and right edges and pockets along segmenting connection lines.

In FIG. 5, the new storage and organizing assembly and system pouch 20 constructed in accordance with the principles of the present invention is shown as configured during fabrication when the blank is folded inside out in order to connect along left edge 16 and right edge 17. After connecting both edges, pouch 20 is folded outside in so that connected edges 16 and 17 are hidden and in order to start forming pockets. With the flexible material blank used to form pouch 20 folded in half, approximately 24 inches wide by approximately 9 inches high, the creation of similarly sized pockets is started by segmenting pouch 20 by connecting front and back side material along left side pocket forming line 41, center pockets forming line 42 and right side pocket forming line 43. Left pocket forming line 41 is approximately 6 inches from left edge 16 and is approximately 7 inches in length from edge 18 or edge 18', center pockets forming line 42 is approximately 12 inches from left edge 16 and is approximately 7 inches in length from edge 18 or 18' and pocket forming line 43 is approximately 6 inches from right edge 17 and is approximately 7 inches long from edge 18 or edge 18'. Pocket forming lines 44 and 44' will be used to create depth of pockets 24 and 26, while pocket forming lines 45 and 46 and 45' and 46' are used to create depth of pockets 22 and 28, respectively, as shown in FIGS. 6 & 7.

Figure 6:
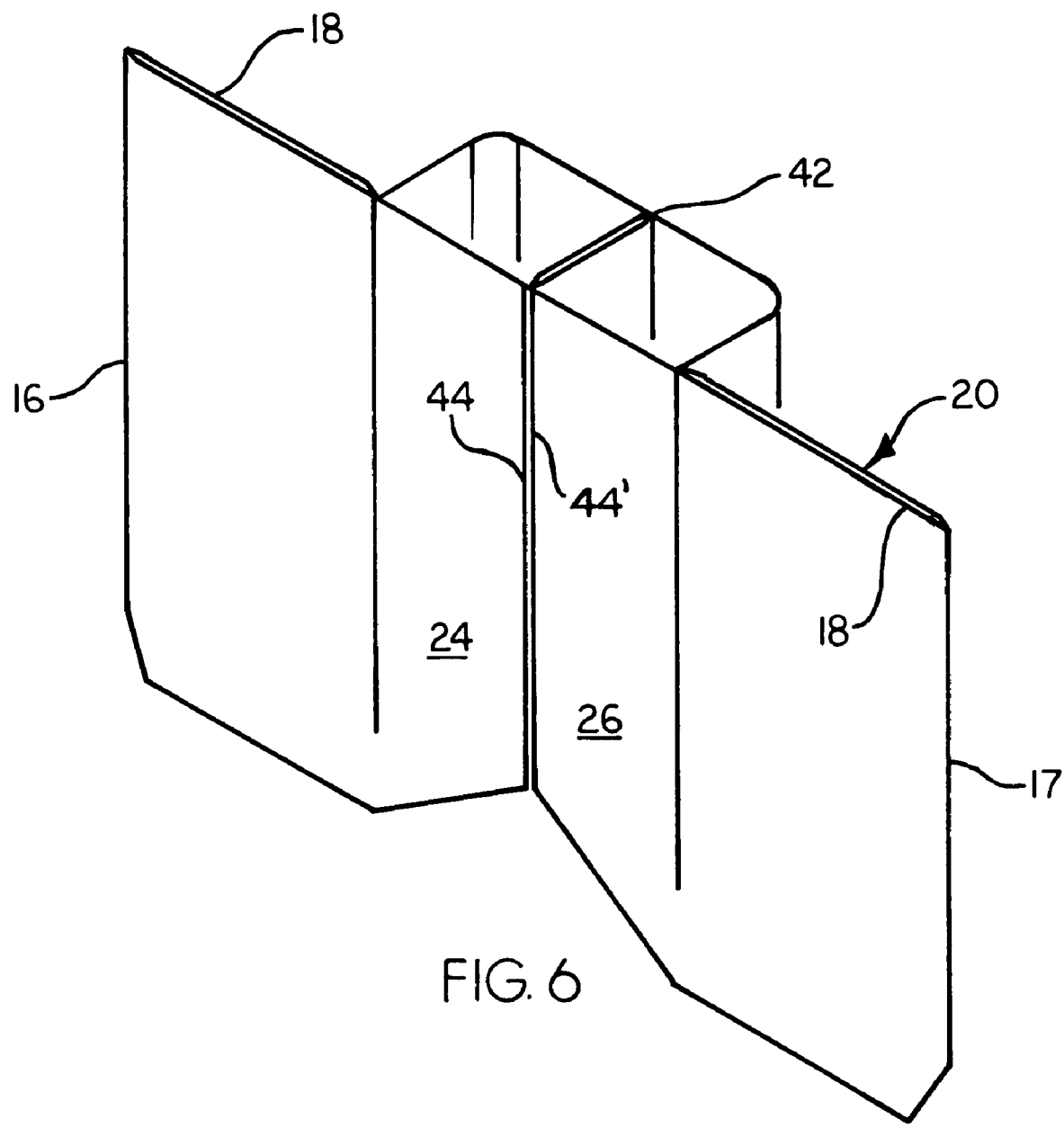
FIG. 6 is a front perspective view of a first preferred embodiment of the present invention showing the process of forming the center pockets.

In FIG. 6, the new storage and organizing assembly and system pouch 20 constructed in accordance with the principles of the present invention is shown in front perspective view as configured during fabrication for creating, in a fold and connect manner, left center pocket 24 and right center pocket 26. The flexible material used to construct pouch 20 is manipulated in order to connect left center pocket forming line 44 to right center pocket forming line 44' around line 42 which was shown in FIG. 5. Left center pocket forming line is located approximately 9 inches from left edge 16 and right center pocket forming line is located approximately 9 inches from right edge 17. The connection along center pocket forming lines 44 and 44' is approximately 7 inches in length from edge 18 or edge 18'.

Figure 7:
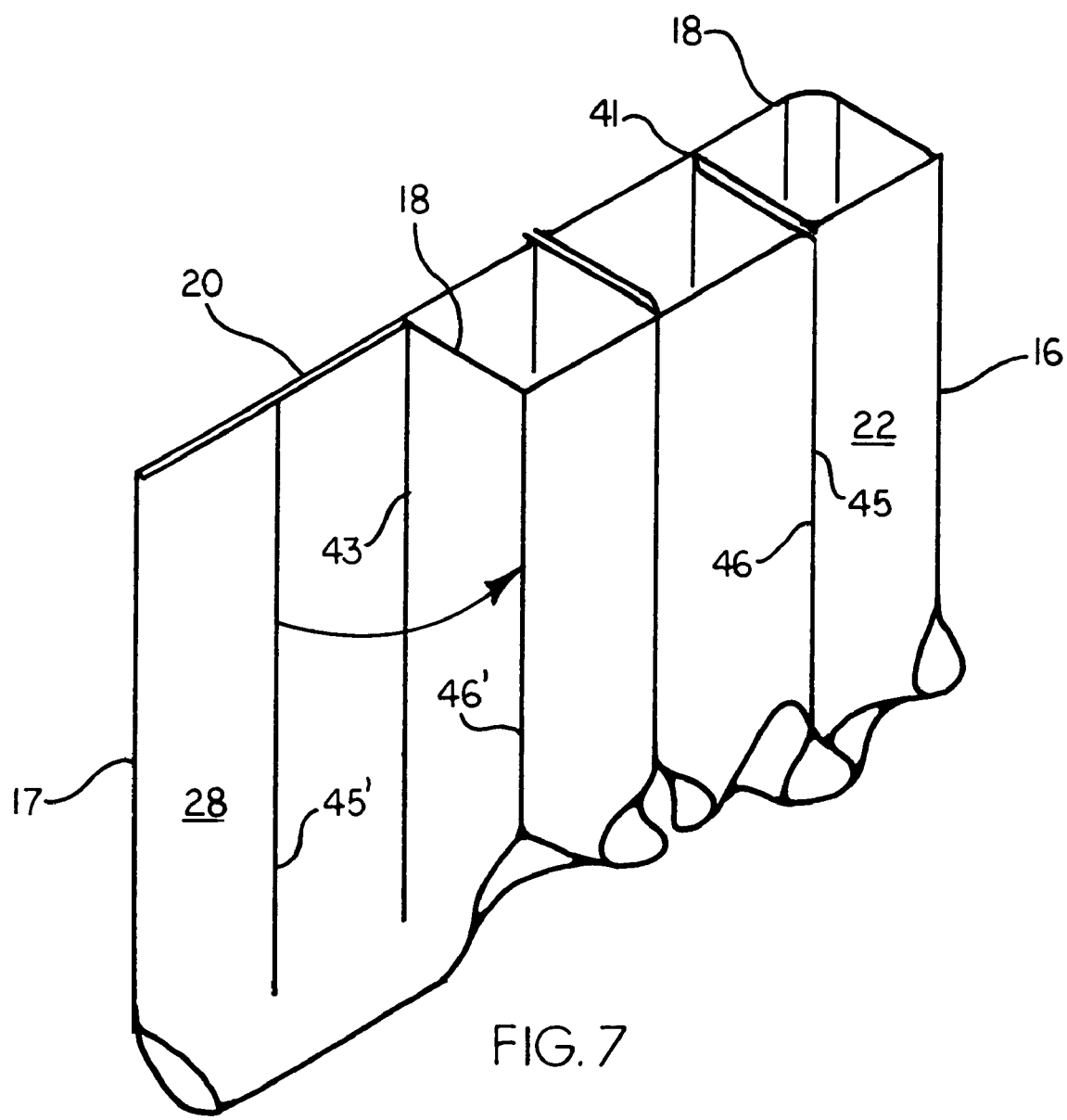
FIG. 7 is a rear perspective view of a first preferred embodiment of the present invention showing the process of forming the outer pockets.

In FIG. 7, the new storage and organizing assembly and system pouch 20 constructed in accordance with the principles of the present invention is shown in rear perspective view as configured during fabrication for creating, in a fold and connect manner, left pocket 22 and right pocket 28. The flexible material used to construct pouch 20 is manipulated in order to create left pocket 22 by connecting left pocket forming line 45 to left center pocket forming line 46 around pocket forming line 41. Left pocket forming line 45 is located approximately 3 inches from left edge 16 and left center pocket forming line 46 is located approximately 9 inches from left edge 16. The connection along left and left center pocket forming lines 45 and 46, is approximately 7 inches in length from edge 18 or edge 18'. The flexible material used to construct pouch 20 is manipulated in order to create right pocket 28 by connecting right pocket forming line 45' to right center pocket forming line 46' around pocket forming line 43 as inferred by the arrow line. Right pocket forming line 45' is located approximately 3 inches from right edge 17 and right center pocket forming line 46' is located approximately 9 inches from right edge 17. The connection along left and left center pocket forming lines 45' and 46', is approximately 7 inches in length from edge 18 or edge 18'.

Figure 8:
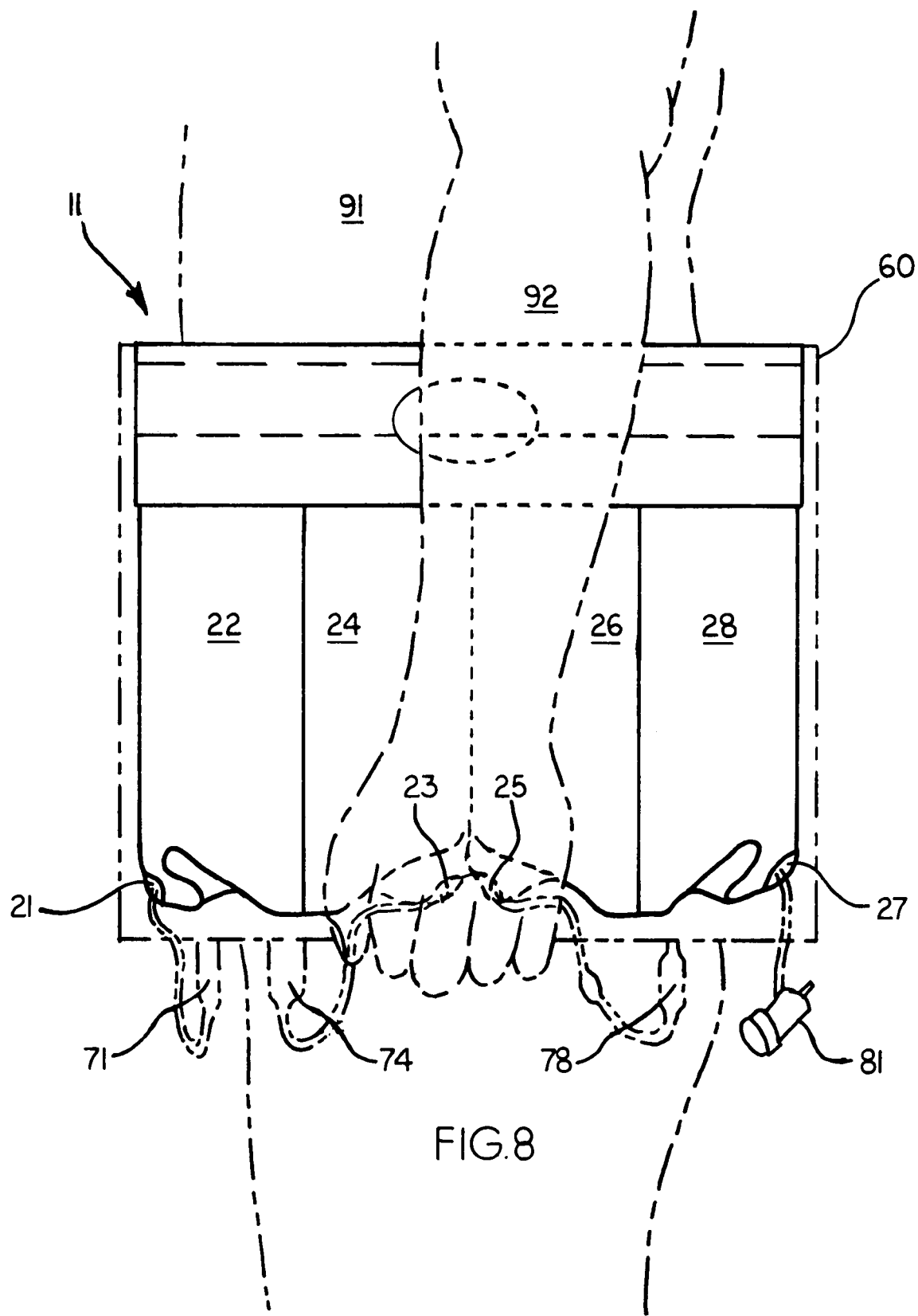
FIG. 8 is a front view of a first preferred embodiment of the present invention affixed to a computer loaded with associated equipment with computer connections maintained while being carried by a computer user.

By referring to FIG. 8 in detail, the new utility of the pouch assembly 11 constructed in accordance with the principles of the present invention may be better appreciated. In FIG. 8, pouch assembly 11, while affixed to computer 60, is carried by computer user 91. The computer user's arm 92 which rests against pouch 11, slightly compresses pouch 11 since it is composed of flexible material and also slightly displaces associated equipment within pockets 24 and 26 and to a lesser degree pockets 22 and 28 thereby creating a more comfortable carrying condition. Associated equipment connections, internet cable connection 71 is maintained by extending through bottom access hole 21, mouse cable connection 74 is maintained by extending through bottom access hole 23, power cord connection 78 is maintained by extending through bottom access hole 25 and a minimal length of security cable 81 extends through bottom access hole 27 while computer 60 and system pouch 11 are affixed to one another and being carried. The aforementioned placement of associated equipment within pockets is for description purposes since the similarity in size of pockets 22, 24, 26 and 28 would let the computer user allocate specific associated equipment to any pocket based on the location of connections per computer manufacturer model.

Figure 9:
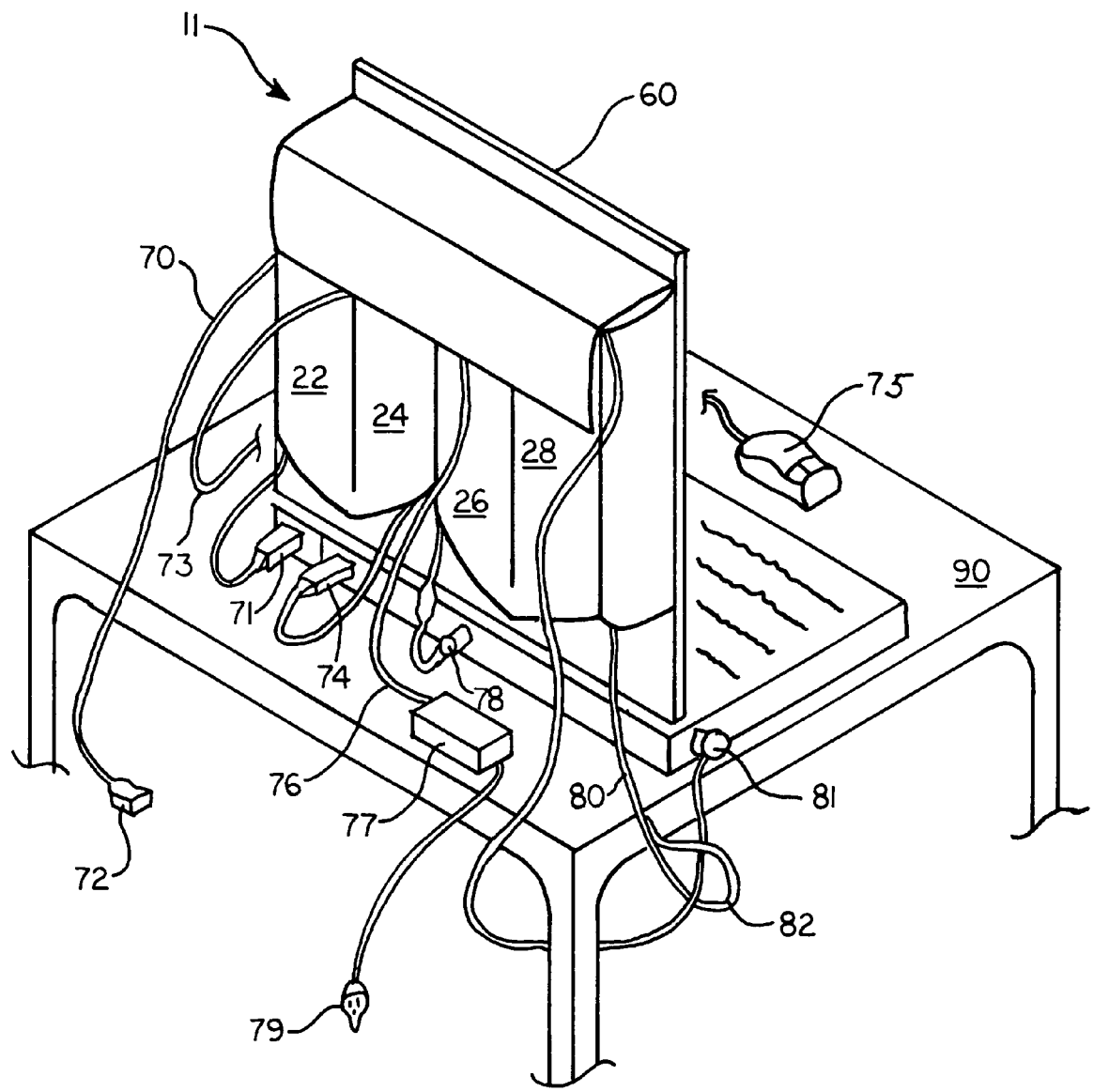
FIG. 9 is a front perspective view of a first preferred embodiment of the present invention affixed to a computer while arranged on a table top configured for use by a computer user.

By referring to FIG. 9 in detail, the new utility of the pouch assembly 11 constructed in accordance with the principles of the present invention may be better appreciated. In FIG. 9, pouch assembly 11, while affixed to computer 60, rests on a table or desk top 90 with connections maintained at internet cable connection 71, mouse connection 74, power cord connection 78 and security cable connection 81. Internet cable 70 is shown removed from pouch 22 with supply side connector 72 available for connection, mouse cable 73 is shown removed from pouch 24 with the mouse device 75 placed on table or desk top 90, power cord 76 is shown removed from pouch 26 with transformer 77 placed on table or desk top 90 with supply side connector 79 available for connection, and security cable 80 is shown removed from pouch 28 with connector 81 looped around a secure device 90 and routed through security cable loop 82. The associated equipment is actually removed from pockets 22, 24, 26 and 28 prior to opening the monitor side portion of the computer in order to not have the computer hinges accommodate any additional significant mass. The aforementioned placement of associated equipment within pockets is for description purposes since the similarity in size of pockets 22, 24, 26 and 28 would let the computer user allocate specific associated equipment to any pocket based on the location of connections per computer manufacturer model.

Figure 10:
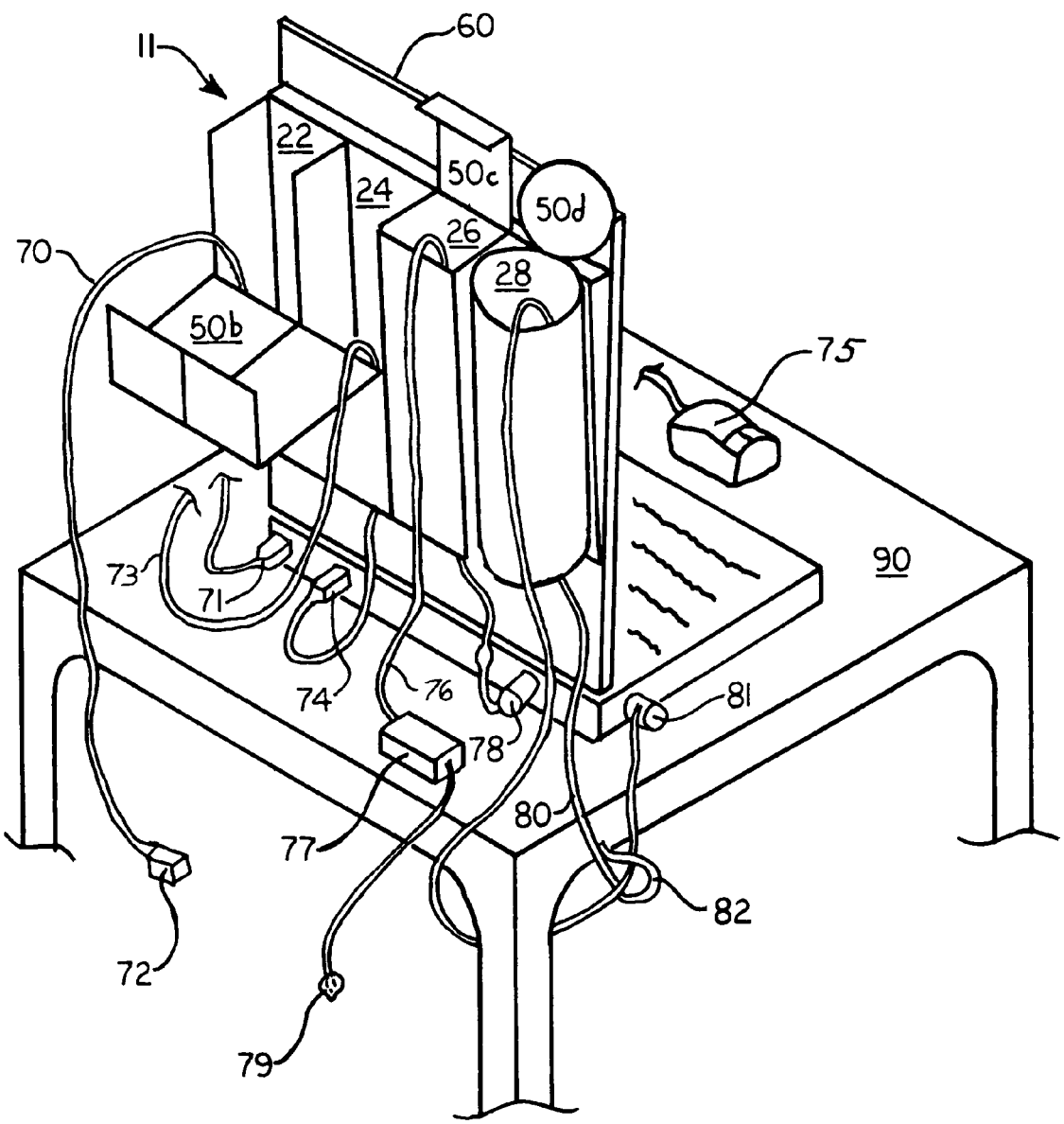
FIG. 10 is a front perspective view of an alternate embodiment composed of less flexible material, such as plastic, depicting different pocket and cover flap configurations.

In FIG. 10, alternate embodiments of the new storage and organizing assembly and system pouch 11 are shown in rear perspective view when fabricated with a less flexible material such as plastic. In FIG. 10, pouch assembly 11, while affixed to computer 60, rests on a table or desk top 90 with connections maintained at internet cable connection 71, mouse connection 74, power cord connection 78 and security cable connection 81. Internet cable 70 is shown removed from pouch 22 with supply side connector 72 available for connection, mouse cable 73 is shown removed from pouch 24 with the mouse device 75 placed on table or desk top 90, power cord 76 is shown removed from pouch 26 with transformer 77 placed on table or desk top 90 with supply side connector 79 available for connection, and security cable 80 is shown removed from pouch 28 with connector 81 looped around a secure device 90 and routed through security cable loop 82. The associated equipment is actually removed from pockets 22, 24, 26 and 28 prior to opening the monitor side portion of the computer in order to not have the computer hinges accommodate any additional significant mass. Storage pockets 22, 24 and 26 are shown configured in a square shape to facilitate formation of a plastic living hinge to allow cover flap 50*b* or 50*c* to open while affixed to computer 60. Pockets 22 & 24 show a low position living hinge for opening cover flap 50*b* which when opened exposes a significant amount of storage pocket to provide the computer user with ample access for easily removing and inserting associated equipment. Pocket 26 shows a living hinge for opening cover flap 50*c*, located high along top edge 18, which allows the computer user to remove and insert associated equipment although the high hinge location reduces the amount of exposed storage pocket for managing associated equipment and is not as robust as the configuration described previously for pockets 22 and 24. Pocket 28 is shown configured in a round shape with cover flap 50*d* affixed to pouch 11 and performs similar to pocket 26 The aforementioned placement of associated equipment within pockets is for description purposes since the similarity in size of pockets 22, 24, 26 and 28 would let the computer user allocate specific associated equipment to any pocket based on the location of connections per computer manufacturer model.

Alternate Embodiments

There are various possibilities with regard to the type of material and fabrication processes used to create a computer cord storing and transporting organizer pouch and system. FIG. 10 shows a computer cord storing and transporting organizer pouch and system composed of a less flexible, plastic material, which is used to form multiple pockets and closures of different shapes and cover flap configurations. The less flexible material would facilitate different fabrication methods and when made of plastic would facilitate incorporation of the cover flap via a living hinge or mechanical attachment. However, the less flexible material described for the alternate embodiments does not allow the pouch to significantly deform while being used by the computer user. The pouch would not deform as easily when the computer user's arm is resting on the pouch while affixed to the laptop or notebook computer thereby minimizing the displacement of associated equipment within the storage pockets creating a less comfortable carrying condition. The pouch would not deform as easily when the computer user's hand is engaged for inserting or removing associated equipment from each storage pocket nor deform as easily while the computer user is inserting the laptop or notebook computer, with pouch affixed to it and loaded with associated equipment, into a computer carrying case or bag.

Operation—FIGS. 8,9,10

The user initially sets up the new computer connector storing and transporting organizer pouch constructed in accordance with the principles of the present invention by removing plastic covering from Velcro-type fasteners to expose adhesive which is used to connect the pouch to the protective surface of the openable monitor portion of the computer. The user locates the pouch within the periphery of the computer with the bottom access holes located close to the computer hinges, which allow the monitor to rotate upward from its base, and presses the adhesive Velcro-type fasteners onto the protective surface of the computer. The user then looks at the arrangement of connectors on the computer to determine which pocket should store each associated equipment in order to minimize the amount of cord length extending from pocket to computer through bottom access holes. The user loads each associated equipment into each pocket by guiding the computer side connector through the bottom access hole and then makes connection to the computer. The remaining cable, including the supply side connector is wrapped around the hand and placed into the pocket. The user then closes the cover flap to retain associated equipment within the pockets prior to transporting the computer and pouch as an assembly.

In use, the pouch loaded with associated equipment and affixed to the computer can easily be carried by the user with one hand. The user's arm rests against the loaded pouch and slightly compresses the flexible material to create a more comfortable carrying condition. Due to the ample size of the pockets relative to typical lengths of associated equipment, the user's arm slightly displaces associated equipment within the pockets which are then compressed to provide an even more comfortable carrying condition. The arrangement of computer connectors often provided by computer manufacturers offer a convenient center location for the user to carry the computer and pouch assembly without interference from minimally extending cords while connections are maintained between the pouch and computer.

In use, the user places the laptop or notebook computer, with the pouch assembly affixed to it and loaded with associated equipment, onto a table or desk top. The user removes the security cable and loops it around a secure device and makes connection to the computer. The user then removes remaining associated equipment and makes supply side connections. The user then opens the monitor portion of the computer and closes the cover flap portion of the pouch before operating the computer. Since the user removes the mass of the associated equipment prior to opening the monitor portion of the computer, the hinges connecting the monitor to computer base do not have to accommodate any additional significant mass. Upon completing computer use, the user closes the monitor portion of the computer, opens the pouch cover flap, disconnects supply side connections and wraps each cord around their hand, places each associated equipment into its appropriate pocket, closes the cover flap and then picks up the laptop or notebook computer, with the pouch affixed to it and loaded with associated equipment, with one hand to transport it to the next location in a comfortable vertical orientation.

CONCLUSIONS, RAMIFICATIONS, SCOPE

Through such setup and use of the present invention, a highly efficient system will be created allowing the user to easily carry the computer with the pouch affixed to it and loaded with associated equipment, with computer side connections permanently maintained via minimal cord extending from the organizing pouch of the present invention to computer, with unwrappable cords and connectors which are then connected between the organizing pouch of the present invention and power and internet services located in wall outlets and jacks, with adequate access for removing and unwrapping security cable between the organizing pouch of the present invention and secure devices.

In summary, the present invention enables users having a portable, "laptop" or "notebook" computer to easily carry and organize cords, cables, mouse, power converters and security cable. In use, the invention provides an organizational system which comprises gathering of cords and connectors into a convenient group, the placement of that group being affixed to the computer to facilitate easy transportation while minimizing the time and energy for set-up and tear down of associated equipment and minimizing the risk of misplacing or damaging necessary components during travel. The invention disclosed herein also provides a device for accomplishing each of these beneficial results, while reducing the size and weight of the device, and while allowing the device to fit easily into a standard size computer case or bag for integration with the users usual travel gear.

Other embodiments will be apparent to those skilled in the art from consideration of the specification and practice of the invention disclosed. It is intended that the specification and examples be considered as exemplary only, with a true scope of the invention being indicated by the following claims and equivalents.

What is claimed is:

1. A computer equipment storing and transporting organizer system comprising:
   a main deformable body, having a left edge, a right edge, a top edge, and a bottom edge;
   said main body having multiple pockets with openings along top and bottom edges; said pockets being substantially disposed on a full width of the main body;
   said main body having means for closing pocket openings along the top edge and means for adhesively attaching said system to a portable computer, wherein the openings along the bottom edge are substantially smaller than the openings along the top edge.

2. The computer equipment storing and transporting organizer system described in claim 1, composed of lightweight material.

3. A method for operating a system for storing and transporting equipment described in claim 1, comprising: attaching the system to a portable computer;
   packing a plurality of equipment into storage pockets of an organizing system;
   removing equipment from said system to operate and make supply side connections;
   working on the computer with equipment routed through said system;
   closing said system with equipment contained therein and connected to the computer;
   transporting said system with portable computer.

4. The system for organizing, storing and transporting equipment described in claim 3 further comprising inserting said system into a carrying case.

* * * * *